US009506365B2

(12) United States Patent
Smoke et al.

(10) Patent No.: US 9,506,365 B2
(45) Date of Patent: Nov. 29, 2016

(54) GAS TURBINE ENGINE COMPONENTS HAVING SEALED STRESS RELIEF SLOTS AND METHODS FOR THE FABRICATION THEREOF

(71) Applicant: HONEYWELL INTERNATIONAL INC., Morristown, NJ (US)

(72) Inventors: Jason Smoke, Phoenix, AZ (US); Bradley Reed Tucker, Chandler, AZ (US); Ardeshir Riahi, Scottsdale, AZ (US); Ed Zurmehly, Phoenix, AZ (US); Alexander MirzaMoghadam, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 400 days.

(21) Appl. No.: 14/257,485

(22) Filed: Apr. 21, 2014

(65) Prior Publication Data

US 2015/0300192 A1 Oct. 22, 2015

(51) Int. Cl.

| | |
|---|---|
| ***F01D 11/00*** | (2006.01) |
| ***B23D 19/00*** | (2006.01) |
| ***F01D 1/06*** | (2006.01) |
| ***F01D 9/04*** | (2006.01) |
| ***F01D 25/12*** | (2006.01) |
| ***B22D 25/02*** | (2006.01) |
| ***B22D 25/06*** | (2006.01) |
| ***B22D 19/00*** | (2006.01) |

(52) U.S. Cl.

CPC ............. *F01D 11/005* (2013.01); *B22D 19/00* (2013.01); *B22D 25/02* (2013.01); *B22D 25/06* (2013.01); *F01D 1/06* (2013.01); *F01D 9/041* (2013.01);

(Continued)

(58) Field of Classification Search

CPC ........ F01D 11/005; F01D 1/06; F01D 9/041; F01D 25/12; B22D 19/00; B22D 25/02; B22D 25/06; F05D 2260/941; F05D 2240/55; F05D 2230/30; F05D 2260/20; F05D 2220/32

USPC ............... 415/134–139, 208.1, 208.2, 208.3, 415/209.1, 211.2; 29/889.22

See application file for complete search history.

(56) References Cited

U.S. PATENT DOCUMENTS

| | | | |
|---|---|---|---|
| 3,781,125 | A | 12/1973 | Rahaim et al. |
| 4,866,828 | A | 9/1989 | Fraser |

(Continued)

FOREIGN PATENT DOCUMENTS

| | | | |
|---|---|---|---|
| FR | 2929983 | A1 | 10/2010 |
| WO | 2014169193 | A1 | 10/2014 |

OTHER PUBLICATIONS

EP Extended Search Report for Application No. EP 15154580.3 dated Aug. 21, 2015.

*Primary Examiner* — Hoang Nguyen

(74) *Attorney, Agent, or Firm* — Lorenz & Kopf, LLP

(57) ABSTRACT

Embodiments of a gas turbine engine component having sealed stress relief slots are provided, as are embodiments of a gas turbine engine containing such a component and embodiments of a method for fabricating such a component. In one embodiment, the gas turbine engine includes a core gas flow path, a secondary cooling flow path, and a turbine nozzle or other gas turbine engine component. The component includes, in turn, a component body through which the core gas flow path extends, a radially-extending wall projecting from the component body and into the secondary cooling flow path, and one or more stress relief slots formed in the radially-extending wall. The stress relief slots are filled with a high temperature sealing material, which impedes leakage between the second cooling and core gas flow paths and which fractures to alleviate thermomechanical stress within the radially-extending wall during operation of the gas turbine engine.

19 Claims, 2 Drawing Sheets

(52) U.S. Cl.
CPC ........... *F01D 25/12* (2013.01); *F05D 2220/32* (2013.01); *F05D 2230/30* (2013.01); *F05D 2240/55* (2013.01); *F05D 2260/20* (2013.01); *F05D 2260/941* (2013.01)

(56) References Cited

U.S. PATENT DOCUMENTS

| | | | |
|---|---|---|---|
| 6,478,537 | B2 | 11/2002 | Junkin |
| 7,097,422 | B2 | 8/2006 | Rice et al. |
| 7,165,944 | B2 | 1/2007 | Gautreau et al. |
| 7,736,128 | B2 | 6/2010 | Huber |
| 8,096,757 | B2 * | 1/2012 | Snook ........................ F01D 9/02 29/889.22 |
| 8,511,089 | B2 | 8/2013 | Bastnagel et al. |
| 8,585,357 | B2 * | 11/2013 | DiPaola .................... F01D 9/04 415/173.6 |
| 2005/0106028 | A1 | 5/2005 | Ahmad |
| 2005/0244267 | A1 * | 11/2005 | Coign ..................... F01D 9/023 415/189 |
| 2007/0025837 | A1 * | 2/2007 | Pezzetti, Jr. .......... F01D 11/005 415/115 |
| 2007/0166154 | A1 | 7/2007 | Ellis et al. |

* cited by examiner

GAS TURBINE ENGINE COMPONENTS HAVING SEALED STRESS RELIEF SLOTS AND METHODS FOR THE FABRICATION THEREOF

STATEMENT REGARDING FEDERALLY-SPONSORED RESEARCH OR DEVELOPMENT

This invention was made with Government support under W911W6-08-2-0001 awarded the U.S. Army (AATE Program). The Government has certain rights in the invention.

TECHNICAL FIELD

The following disclosure relates generally to gas turbine engines and, more particularly, to turbine nozzles and other gas turbine engine components having stress relief slots filled with high temperature sealing material, as well as to methods for fabricating gas turbine engine components having sealed stress relief slots.

BACKGROUND

Gas turbine engines are commonly produced to include turbine nozzles, which accelerate and turn combustive gas flow toward the blades of a turbine rotor downstream of the nozzle. The turbine nozzle may have a generally annular or ring-shaped body including an inner endwall, an outer endwall circumscribing the inner endwall, and a series of circumferentially-spaced vanes extending between the inner and outer endwalls. The inner endwall, the outer endwall, and the vanes define a number of combustive gas flow paths through the turbine nozzle, which conduct hot combustive gas flow during operation of the gas turbine engine. While portions of the nozzle are exposed to combustive gas flow during engine operation, other portions of the turbine nozzle body and its associated mounting features are bathed in relatively cool airflow bled from a cold section of the engine and directed along an outer cooling flow path. In certain cases, undesired leakage can occur across the turbine nozzle interface between the outer cooling flow path and the core gas flow path. Such leakage can negatively affect the efficiency of the gas turbine engine, especially when smaller in size, and may increase the volume of airflow required for cooling purposes.

Leakage across the turbine nozzle mounting interfaces can be reduced through the usage of annular compression seals, such as flexible, pressure-activated metal seals. Such seals may be compressed between the mounting features of the turbine nozzle (e.g., rails extending radially from the opposing ends of the nozzle) and neighboring static structures within the engine. Temperature limitations may require that such compression seals are radially offset from the core gas flow path by a certain distance to reduce the operational temperatures to which the seals are exposed. The turbine nozzle rails may thus be elongated in a radial direction to allow such a radial offset between the compression seals and the core gas flow path. Unfortunately, this also has the effect of increasing temperature differentials that develop across the radially-elongated rails during engine operation, which may result in excessively high hoop stresses within the rails thereby hastening Thermomechanical Fatigue (TMF) and reducing the service lifespan of the turbine nozzle. TMF within the turbine nozzle rails may be alleviated through the formation of stress relief slots at strategic locations in the nozzle rail. The inclusion of stress relief slots in the nozzle rail may, however, permit an undesirably large amount of leakage across the turbine nozzle mounting interfaces thereby defeating the purpose of the compression seals or at least diminishing the effectiveness thereof.

It is thus desirable to provide embodiments of a turbine nozzle having stress relief slots formed at one or more circumferential locations in the radially-elongated rails or similar mounting features, which reduce TMF within the turbine nozzle while also minimizing leakage across the turbine nozzle mounting interfaces. More generally, it would be desirable to produce embodiments of a gas turbine engine component, such as a turbine nozzle or a combustor liner, including stress relief slots providing the above-noted benefits. Finally, it would be desirable to provide embodiments of a gas turbine engine employing such a gas turbine engine component, as well as methods for fabricating such a gas turbine engine component. Other desirable features and characteristics of the present invention will become apparent from the subsequent Detailed Description and the appended Claims, taken in conjunction with the accompanying Drawings and the foregoing Background.

BRIEF SUMMARY

Embodiments of a gas turbine engine are provided including a core gas flow path, a secondary cooling flow path, and a gas turbine engine component. The gas turbine engine component includes a component body through which the core gas flow path extends, a radially-extending wall projecting from the component body and into the secondary cooling flow path, and one or more stress relief slots formed in the radially-extending wall. The stress relief slots are filled with a high temperature sealing material, which impedes leakage between the secondary cooling and core gas flow paths and which cracks or fractures to alleviate thermomechanical stress within the radially-extending wall during operation of the gas turbine engine.

Further provided are embodiments of a gas turbine engine component, such as a turbine nozzle or combustor liner. In one embodiment, the gas turbine engine component includes a component body having a radially-extending wall projecting therefrom. The component body and the radially-extending wall are exposed to a core gas flow path and to a secondary cooling flow path, respectively, when the gas turbine engine component is installed within the gas turbine engine. A plurality of stress relief slots extends axially through the radially-extending wall. A high temperature sealing material plugs or fills the plurality of stress relief slots and impedes leakage across the radially-extending wall. The high temperature sealing material cracks or factures to alleviate thermomechanical stress when a temperature differential develops across the radially-extending wall during usage of the component.

Still further provided are embodiments of a method for fabricating a gas turbine engine component, such as a turbine nozzle or combustor liner. In one embodiment, the method includes obtaining a component body having a radially-extending wall projecting therefrom, cutting or otherwise forming a plurality of stress relief slots in the radially-extending wall, and infiltrating or filling the plurality of stress relief slots with a high temperature sealing material to impede leakage across the radially-extending wall between the secondary cooling and core gas flow paths. The high temperature sealing material is selected to have a mechanical strength less than the parent material of the radially-extending wall such that the sealing material preferentially fractures to relieve thermomechanical stress when a temperature gradient develops across the radially-extending wall during usage of the turbine nozzle.

BRIEF DESCRIPTION OF THE DRAWINGS

At least one example of the present invention will hereinafter be described in conjunction with the following figures, wherein like numerals denote like elements, and.

Figure 1:
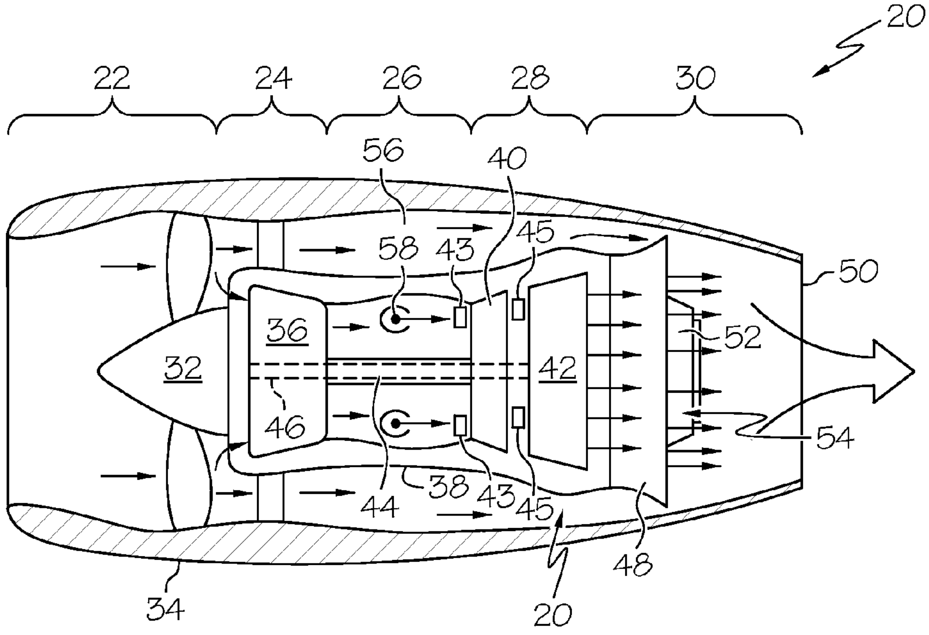
FIG. 1 is a schematic of an exemplary gas turbine engine including one or more turbine nozzles.

For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in the figures may be exaggerated relative to other elements or regions to help improve understanding of embodiments of the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements.

FIG. 1 is a simplified cross-sectional view of a gas turbine engine (GTE) 20 illustrated in accordance with an exemplary embodiment of the present invention. By way example, GTE 20 is illustrated in FIG. 1 as a two spool turbofan engine including an intake section 22, a compressor section 24, a combustion section 26, a turbine section 28, and an exhaust section 30. Intake section 22 includes an intake fan 32 mounted in a nacelle assembly 34. In the illustrated example, compressor section 24 includes a single compressor 36, which is rotatably disposed within an engine case 38 mounted within nacelle assembly 34. Turbine section 28 includes a high pressure (HP) turbine rotor 40 and a low pressure (LP) turbine rotor 42, which are rotatably disposed within engine case 38 in flow series. An HP turbine nozzle 43 is disposed immediately upstream of HP turbine rotor 40, and an LP turbine nozzle 45 is likewise disposed upstream of LP turbine rotor 42. Compressor 36 and HP turbine rotor 40 are mounted to opposing ends of an HP shaft 44, and intake fan 32 and LP turbine rotor 42 are mounted to opposing ends of a LP shaft 46. LP shaft 46 and HP shaft 44 are co-axial; that is, LP shaft 46 extends through a longitudinal channel provided through HP shaft 44. Engine case 38 and nacelle assembly 34 terminate in a mixer nozzle 48 and a propulsion nozzle 50, respectively. Mixer nozzle 48 cooperates with a centerbody 52 to form an exhaust mixer 54, which mixes hot combustive gas flow received from turbine section 28 with cooler bypass airflow during operation of GTE 20.

As illustrated in FIG. 1 and described herein, GTE 20 is provided by way of example only. It will be readily appreciated that turbine rotors or other metallurgically-consolidated turbine engine components of the type described herein can be utilized within various other types of gas turbine engine including, but not limited to, other types of turbofan, turboprop, turboshaft, and turbojet engines, whether deployed onboard an aircraft, watercraft, or ground vehicle (e.g., a tank), included within an auxiliary power unit, included within industrial power generators, or utilized within another platform or application. With respect to exemplary GTE 20, in particular, it is noted that the particular structure of GTE 20 will inevitably vary amongst different embodiments. For example, in certain embodiments, GTE 20 may include an exposed intake fan (referred to as an "open rotor configuration") or may not include an intake fan. In other embodiments, GTE 20 may employ centrifugal compressors or impellers in addition to or in lieu of axial compressors. In still further embodiments, GTE 20 may include a single shaft or three or more shafts along with varying numbers of compressors and turbines.

During operation of GTE 20, air is drawn into intake section 22 and accelerated by intake fan 32. A portion of the accelerated air is directed through a bypass flow passage 56, which is provided between nacelle assembly 34 and engine case 38 and conducts relatively cool airflow over and around engine case 38. The remaining portion of air exhausted from intake fan 32 is directed into compressor section 36 and compressed by compressor 36 to raise the temperature and pressure of the core airflow. The hot, compressed airflow is supplied to combustion section 26 wherein the air is mixed with fuel and combusted utilizing one or more combustors 58 included within section 26. The combustive gasses expand rapidly and flow through turbine section 28 to rotate the turbine rotors of HP turbine rotor 40 and LP turbine rotor 42. HP turbine nozzle 43 further accelerates the combustive gas flow and helps to impart the gas flow with a desired tangential component prior to reaching HP turbine rotor 40. Similarly, LP turbine nozzle 45 receives the gas flow discharged from HP turbine rotor 40, accelerates and turns the gas flow toward the blades of LP turbine rotor 42. The rotation of turbine rotors 40 and 42 drives the rotation of shafts 44 and 46, respectively, which, in turn, drives the rotation of compressor 36 and intake fan 32. The rotation of shafts 44 and 46 also provides significant power output, which may be utilized in a variety of different manners, depending upon whether GTE 20 assumes the form of a turbofan, turboprop, turboshaft, turbojet engine, or an auxiliary power unit, to list but a few examples. After flowing through turbine section 28, the combustive gas flow is then directed into exhaust section 30 wherein mixer 54 mixes the combustive gas flow with the cooler bypass air received from bypass flow passages 56. Finally, the combustive gas flow is exhausted from GTE 20 through propulsion nozzle 50.

Figure 2:
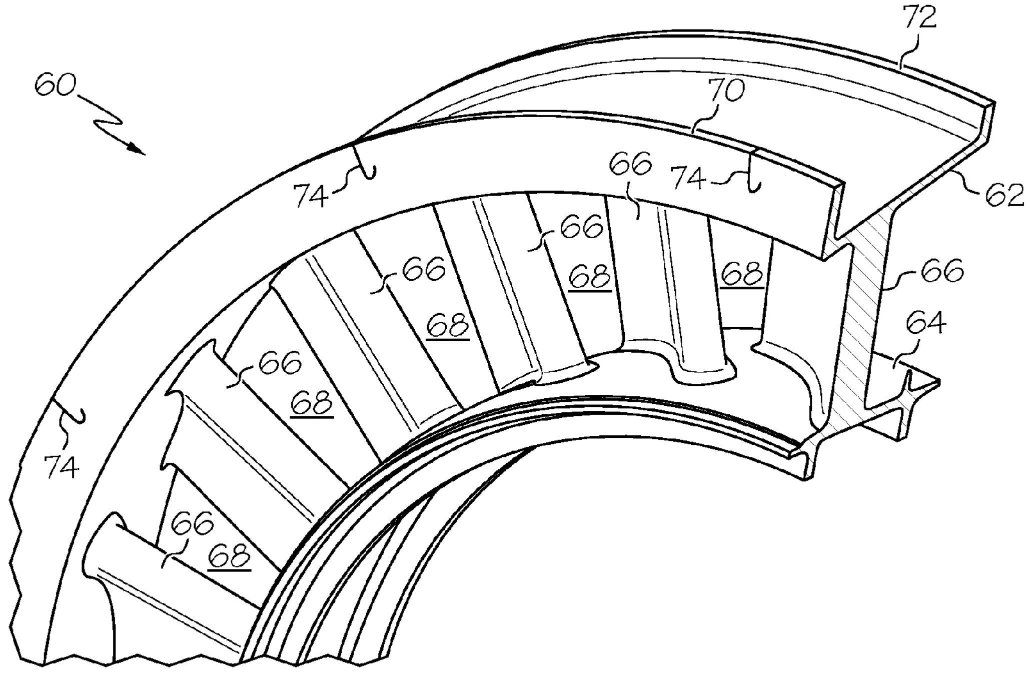
FIG. 2 is an isometric cutaway view of a turbine nozzle (partially shown) suitable for usage within the gas turbine engine shown in FIG. 1, which has a plurality of sealed stress relief slots formed therein and which is illustrated in accordance with an exemplary embodiment of the present invention.

FIG. 2 is an isometric cutaway view of a turbine nozzle 60 (partially shown), as illustrated in accordance with an exemplary embodiment of the present invention. Turbine nozzle 60 can be utilized as HP turbine nozzle 43 or as LP turbine nozzle 45 shown in FIG. 1. Turbine nozzle 60 includes an annular or ring-shaped body comprised of an outer ring or endwall 62, an inner ring or endwall 64, and a plurality of airfoils or vanes 66. While only a limited portion of nozzle 60 is shown in FIG. 2, it will be appreciated that endwalls 62 and 64 are annular structures, which are generally axisymmetric with respect to the centerline of nozzle 60 and which extend fully therearound (and, thus, around the rotational axis of GTE 20 when nozzle 60 is installed therein). Nozzle vanes 66 extend radially between outer endwall 62 and inner endwall 64 to define a number of combustive gas flow paths 68 through the body of turbine nozzle. Each gas flow path 68 is defined by a different pair of adjacent or neighboring vanes 66; an inner surface of outer endwall 62 located between the neighboring vanes 66, as taken in a radial direction; and an interior surface region of inner endwall 64 located between the neighboring vanes 66, as taken in a radial direction. Gas flow paths 68 extend through turbine nozzle 60 in axial and tangential directions to guide combustive gas flow through the body of nozzle 60, while turning the gas flow toward the blades of a turbine rotor downstream thereof. Gas flow paths 68 may constrict or decrease in cross-sectional flow area when moving in a fore-aft direction along which combustive gas flows during engine operation. Each flow path 68 thus serves as a convergent nozzle to meter and accelerate combustive gas flow through turbine nozzle 60.

Turbine nozzle 60 is fabricated to further include mounting features facilitating installation of nozzle 60 within a gas turbine engine. For example, as indicated in FIG. 2, turbine nozzle 60 may be fabricated to include a leading or forward rail 70 and a trailing or aft rail 72. Forward rail 70 projects radially outward from a forward edge portion of outer endwall 62, while trailing or aft rail 72 projects radially outward from the opposing trailing edge portion of endwall 62. Nozzle rails 70 and 72 are generically referred to herein as "radially-extending walls," as are any structures that project radially outwardly from the body of a gas turbine engine component. Rails 70 and 72 are advantageously formed as annular structures extending entirely around the forward and aft edges of outer endwall 62, respectively. In the illustrated embodiment, rail 70, rail 72, and outer endwall 62 are formed as a single piece or monolithic structure, which extends around the centerline of nozzle 60 to form an unbroken or continuous 360° hoop. However, in further embodiments, such as when turbine nozzle 60 is produced as a segmented turbine nozzle (described below), rail 70, rail 72, and outer endwall 62 can be comprised of a number of arc-shaped pieces, which are assembled to form a segmented annular structure extending around the centerline of nozzle 60. In this case, feather seals or other seals can be disposed between the mating interfaces of the arc-shaped pieces to help minimize leakage across turbine nozzle 60.

Nozzle rails 70 and 72 may be integrally formed with outer endwall 62 as, for example, as a single cast piece. More generally, turbine nozzle 60 may itself be produced as a single cast and machined piece or, perhaps, produced utilizing multiple cast pieces. In this latter regard, turbine nozzle 60 may be fabricated as a brazed turbine nozzle wherein endwall 62, endwall 64, and vanes 66 are cast as separate pieces, which are subsequently assembled and bonded to yield the finished nozzle 60. In further embodiments, turbine nozzle 60 can be produced as a bi-cast turbine nozzle wherein vanes 66 are first cast, arranged in their desired positions, and endwalls 62 and 64 are then cast thereover using an investment casting process. In further embodiments, multiple wedge-shaped or arc-shaped pieces are cast and subsequently bolted together or otherwise assembled to produce the completed turbine nozzle (commonly referred to as a "segmented turbine nozzle"). Each arc-shaped piece may include a segment of the outer endwall, a segment of the inner endwall, and a number of vanes (typically two to three vanes) extending therebetween. Thus, when assembled, the arc-shaped pieces collectively form an annular turbine nozzle similar to that shown in FIG. 2, but with mating interfaces between neighboring sections of the turbine nozzle. In this case, nozzle rails 70 and 72 may comprise multiple sections, which may or may not contact. The foregoing examples notwithstanding, various other fabrication techniques can also be utilized to produce turbine nozzle 60.

Figure 3:
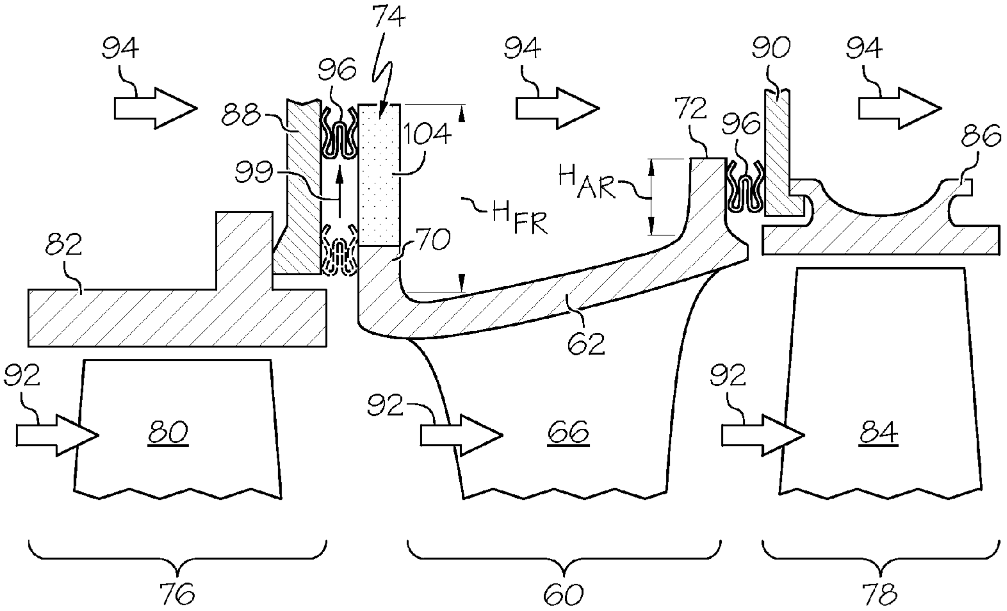
FIG. 3 is a cross-sectional view of the turbine nozzle shown in FIG. 2 illustrating one manner in which the turbine nozzle may be positioned between high and low pressure turbine stages when installed within a gas turbine engine.

FIG. 3 is a cross-sectional view of turbine nozzle 60 illustrating one manner in which nozzle 60 may be mounted within a gas turbine engine, such as GTE 20 shown in FIG. 1. In this particular example, nozzle 60 is disposed between an upstream turbine stage 76 and a downstream turbine stage 78. Upstream turbine stage 76 may include a turbine rotor having a number of blades 80 (one of which is partially shown in FIG. 3), which are circumscribed or surrounded by a first turbine shroud 82. Similarly, downstream turbine stage 78 may likewise include a turbine rotor having a number of blades 84 (again, one of which is partially shown) circumscribed by a second turbine shroud 86. Turbine shrouds 82 and 86 are static components, which are bolted or otherwise affixed to static mounting features included within the engine infrastructure. Two such static mounting features 88 and 90 are shown in FIG. 3 and engaged by turbine shrouds 82 and 86, respectively. As indicated in FIG. 3 by arrows 92, a core gas flow path extends through turbine stage 76, turbine nozzle 60, and turbine stage 78. Collectively, turbine shroud 82, turbine shroud 86, and turbine nozzle 60 partition or separate the core gas flow path from a secondary cooling flow path, which is located radially outboard of the core gas flow path. As further indicated by arrows 94, the secondary cooling flow path conducts relatively cool airflow bled from an upstream cold section of the engine and supplied to components within the hot section of the engine for cooling purposes.

Leakage between the secondary cooling flow path and the core gas flow path may occur at the interfaces between the turbine nozzle 60, mounting feature 88, and mounting feature 90 if not adequately sealed. In the case of larger gas turbine engines, such leakage may have relatively little impact on engine performance. However, in the case of smaller gas turbine engine platforms, leakage between the secondary cooling and core gas flow paths can have an appreciable impact on overall engine performance. Additionally, leakage between the secondary cooling and core gas flow paths can increase the volume of airflow bled from the cold section and directed along secondary cooling flow path 94 for cooling purposes. Annular compression seals can be utilized to significantly reduce such leakage. For example, as shown in FIG. 2, a first annular compression seal 96 may be positioned between static mounting feature 88 and forward rail 70 of turbine nozzle 60, while a second annular compression seal 98 may be positioned between static mounting feature 90 and aft rail 72 of nozzle 60. As generally illustrated in FIG. 3, annular compression seals 96 and 98 may be pressure-activated metal seals having convolute cross-sectional geometries. Compression seals of this type are highly effective at minimizing or eliminating leakage across the turbine nozzle mounting interfaces. In further embodiments, seals 96 and 98 may assume other forms suitable for forming annular gas-to-gas seals between the turbine nozzle rails and their associated mounting features.

While effective at impeding gas flow leakage, annular compression seals 96 and 98 may be associated with temperature limitations requiring compression seal 96 and/or seal 98 to be radially offset from the core gas flow path 92. For example, and with continued reference to the exemplary embodiment shown in FIGS. 2 and 3, the operational temperatures to which seal 96 is subjected if disposed in close proximity to the core gas flow path 92 (indicated in FIG. 3 in phantom) may be undesirably high. Consequently, as indicated by arrow 99, compression seal 96 may be moved (by design) to a more remote position radially offset from gas path 92, which is heated to somewhat lower temperatures during engine operation. As further indicated in FIG. 3, the radial length or height of forward nozzle rail 70 (identified as "$H_{FR}$") is increased to allow compression seal 96 to be moved radially outward in this manner. However, in further embodiments, the radial height of aft rail 72 (identified as "$H_{AR}$") may be increased in essentially the same manner as is the height of forward rail 70 to allow a radial offset between compression seal 98 and gas flow path 92.

Figure 4:
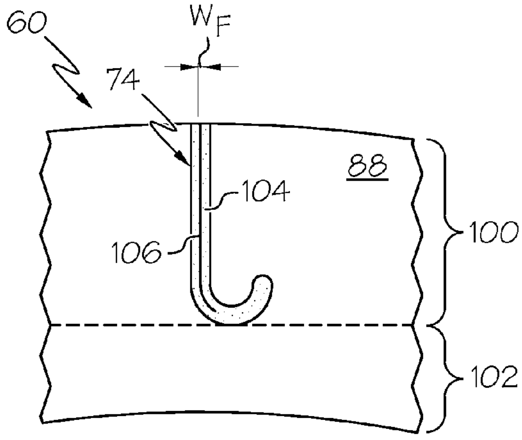
FIGS. 4 and 5 are front views of a sealed stress relief slot included within the exemplary turbine nozzle shown in FIGS. 2 and 3, as illustrated after and prior to filling with a high temperature sealing material, respectively.

As the radial height ($H_{FR}$) of forward nozzle rail 70 increases, so too does the temperature differential that develops across rail 70 during engine operation. Undesirably rapid TMF may consequently occur within nozzle rail 70 and the neighboring regions of turbine nozzle 60 if the resultant thermomechanical stress is not addressed. For this reason, a plurality of stress relief slots 74 may be formed through an outer annular region of nozzle rail 70. Stress relief slots 74 may be angularly spaced about the centerline of nozzle 60 at substantially regular intervals; however, this need not always be the case. FIG. 4 illustrates one stress relief slot 74 in greater detail. Referring collectively to FIGS. 2-4, stress relief slots 74 extend axially through an outer annular portion 100 of forward nozzle rail 70 (identified in FIG. 4) and terminate adjacent inner annular portion 102 of rail 70 (also identified in FIG. 4). Outer annular portion 100 of forward rail 70 remains relatively cool during engine operation, while inner annular portion 102 of rail 70 is heated to relatively high temperatures. Absent stress relief slots 74, the outer radial growth of inner annular portion 102 is restricted by outer annular portion 100 and relatively rapid TMF may result. Stress relief slots 74 allow the outer annular region of rail 70 to better accommodate the outward radial growth of inner annular portion 102 (essentially by breaking the tensile hoop stress within outer annular portion 100) thereby reducing compressive hoop stress within inner annular portion 102 of rail 70. Stress relief slots 74 may have any shape suitable for providing this stress relief function, such as a J-shaped geometry (shown), an anchor-shaped geometry, or keyhole-shaped geometry. It is generally preferred, however, that stress relief slots 74 are produced to have substantially uniform widths to facilitate filling with the high temperature sealing material, as described more fully below.

With continued reference to FIGS. 2-4, and as shown most clearly in FIG. 3, stress relief slots 74 extend radially inward or inboard of compression seal 96 and through the annular sealing surface of rail 70 (that is, the annular region of rail 70 contacting compression seal 96). Significant gas flow leakage may thus occur across forward rail 70 (thereby bypassing compression seal 96) if stress relief slots 74 are left open or unfilled. To minimize such leakage, stress relief slots 74 are filled or plugged with a high temperature sealing material 104 (identified in FIGS. 3 and 4 by dot stippling).

Various different types of sealing material can be utilized to plug or fill stress relief slots 74, providing that the following criteria are met: (i) the sealing material has high temperature properties sufficient to withstand the operating conditions within the gas turbine engine without excessive degradation, (ii) the sealing material is able to form a sufficiently strong bond with the interior surfaces of slots 74 to prevent dislodgement during usage of turbine nozzle 60, and (iii) the sealing material has a mechanical strength less than that of the nozzle rail parent material to enable the sealing material to crack or fracture and relieve thermomechanical stress in the below-described manner. Materials satisfying the aforementioned criteria include, but are not limited to, high temperature braze materials. In one embodiment, a nickel-based braze material containing at least one melting point depressant, such as a relatively small weight percentage of boron, is utilized as the high temperature sealing material.

Figure 5:
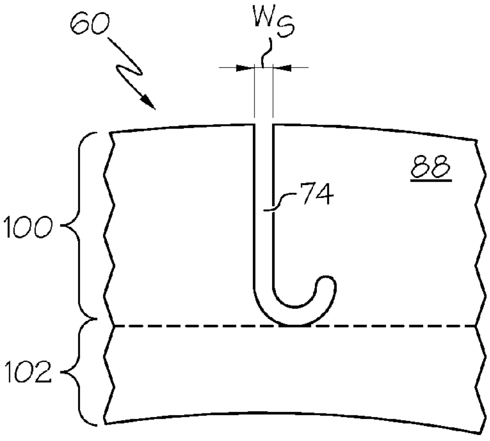

During fabrication of turbine nozzle 60, stress relief slots 74 may be cut into forward nozzle rail 70 utilizing, for example, an Electrical Discharge Machining (EDM) wire technique. Advantageously, such a technique may allow the respective widths of slots 74 to be minimized. For example, as indicated in FIG. 5 (which illustrates one of stress relief slots 74 prior to filling with high temperature sealing material), slots 74 may be formed to have a width of $W_S$, which may be on the order of about 0.008 to 0.010 inch. The chosen high temperature sealing material may be introduced into stress relief slots 74 after slots 74 have been cut or otherwise formed in forward rail 70. In embodiments wherein a high temperature braze material is utilized, the braze material may be disposed adjacent or within stress relief slots 74 and then subjected to heat treatment to melt the braze, fill slots 74 with little to no voiding, and form the desired bonds between the braze material and the interior surfaces of slots 74. In certain implementations wherein the braze material is needle-dispensed, brushed, or otherwise applied in liquid or slurry form over stress relief slots 74, the braze material may flow into slots 74 by capillary forces prior to or during heat treatment. In other implementations, the braze foil may be cut into flexible strips, which are then inserted into stress relief slots 74, In this latter case, the strips of braze foil may extend beyond stress relief slots 74 to ensure a sufficient volume of braze is present to completely fill slots 74 without voiding when subject to heat treatment. If desired, the strips of braze foil may be augmented with braze paste.

As a temperature gradient develops across forward nozzle rail 70, hairline cracks or factures may develop within the high temperature sealing material 104 contained within stress relief slots 74. Such fractures are advantageous in the sense that they allow stress relief slots 74 to provide their primary function of alleviating thermomechanical stress within forward rail 70 and turbine nozzle 60 during engine operation. It may be noted that a certain amount of leakage may occur across the fractures within sealed stress relief slots 74. However, any such leakage will be a small fraction of that which would otherwise occur if stress relief slots 74 were not filled with the high temperature sealing material. This may be more fully appreciated by referring once again to FIG. 4, which depicts a hairline fracture 106 that may form in the body of sealing material 104 occupying the illustrated slot 74 during usage of nozzle 60. As can be seen, the width of fracture 106 (identified in FIG. 4 as "$W_F$") is significantly less than the overall width of slot 74 (again, identified in FIG. 5 as "$W_S$"). For example, the width of fracture 106 ($W_F$) may be less than 0.001 inch in an embodiment and, therefore, approximately ⅛ to 1/10 the width of stress relief slot 74 (when produced to have a width of about 0.008 to 0.010 inch, as described above). Thus, even when considered in the aggregate, such fractures 106 allow relatively little leakage to flow axially across forward nozzle rail 70 and bypass compression seal 96 (FIG. 3). As a result, leakage across the turbine nozzle mounting interfaces is minimized, and overall gas turbine engine efficiency is improved. Moreover, in at least some cases, a minimal amount of leakage through sealed stress relief slots 74 may be beneficial by helping to purge pockets of hot combustive gas that may otherwise remain trapped near the nozzle mounting interfaces.

The foregoing has thus provided embodiments of a gas turbine engine component including sealed stress relief slots, which reduce thermomechanical stress while also minimizing leakage between core gas flow and secondary cooling flow paths. In certain embodiments, the stress relief slots may be formed in the forward and/or aft rail of a turbine nozzle and filled with a braze material, such as a nickel-based braze material. The high temperature sealing material is preferably selected to have a mechanical strength less than the parent material of the nozzle rail such that the sealing material preferentially fractures to alleviate thermomechanical stress within the rail during operation of the gas turbine engine; the term "fracture" encompassing separations occurring along the bond interface between the high temperature sealing material and the surfaces of the stress relief slots. While primarily described in the context of a turbine nozzle having one or more radially-elongated rails, it is emphasized that the sealed stress relief slots can also be formed in other gas turbine engine component having at least one radially-extending wall projecting from the component body and into a secondary cooling flow path. For example, in further embodiment, the sealed stress relief slots may be formed in a radially-extending flange provided around the aft outlet end of a combustor liner.

While primarily described above in the context of a turbine engine component and, specifically, a turbine nozzle. The foregoing description also provided embodiments of a method for fabricating such a gas turbine engine component. In one embodiment, the method includes independently fabricating, purchasing from a supplier, or otherwise obtaining a component body having a radially-extending wall projecting therefrom. A plurality of stress relief slots is cut into or otherwise formed in the radially-extending wall. The plurality of stress relief slots are then filled or infiltrated with a high temperature sealing material, which impedes leakage across the radially-extending wall between the core gas flow path and the secondary cooling flow path. The high temperature sealing material is selected or formulated to have a mechanical strength less than the material from which the radially-extending wall is produced such that the high temperature sealing material preferentially fractures to relieve thermomechanical stress when a temperature gradient develops across the radially-extending wall.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A gas turbine engine, comprising:
a core gas flow path;
a secondary cooling flow path; and
a gas turbine engine component, comprising:
a component body through which the core gas flow path extends;
a radially-extending wall projecting from the component body into the secondary cooling flow path;
one or more stress relief slots formed in the radially-extending wall and having interior surfaces; and
a high temperature braze material infiltrated into the one or more stress relief slots and bonded to the interior surfaces thereof, the high temperature braze material impeding leakage between the secondary cooling flow path and the core gas flow path, and fracturing to alleviate thermomechanical stress within the radially-extending wall during operation of the gas turbine engine.

2. The gas turbine engine of claim 1 wherein the gas turbine engine component comprises a turbine nozzle, and wherein the component body comprises:
an inner endwall;
an outer endwall circumscribing the inner endwall; and
a plurality of circumferentially-spaced vanes extending between the inner and outer endwalls.

3. The gas turbine engine of claim 2 wherein the radially-extending wall comprises a rail projecting radially outward from an edge portion of the outer endwall.

4. The gas turbine engine of claim 3 wherein the rail has a generally annular shape and extends around the edge portion of the gas turbine engine, and wherein the one or more stress relief slots comprise a plurality of stress relief slots spaced around the rail at substantially regular intervals.

5. The gas turbine engine of claim 4 wherein the rail and the outer endwall are integrally formed as a single piece.

6. The gas turbine engine of claim 2 wherein the rail comprises an annular sealing surface, and wherein the gas turbine engine further comprises:
static engine infrastructure to which the rail is attached; and
an annular compression seal disposed between the static engine infrastructure and the sealing surface of the rail, the one or more stress relief slots extending through the sealing surface of the rail.

7. The gas turbine engine of claim 6 wherein the one or more stress relief slots extend radially inboard the annular compression seal.

8. The gas turbine engine of claim 1 wherein the one or more stress relief slots have a substantially constant width.

9. The gas turbine engine of claim 1 wherein the stress relief slots each have a generally J-shaped geometry.

10. The gas turbine engine of claim 1 wherein the high temperature braze material comprises a nickel-based braze material.

11. A gas turbine engine component for usage within in a gas turbine engine having a core gas flow path and a secondary cooling flow path, the gas turbine engine component comprising:
a component body having a radially-extending wall projecting therefrom, the component body and the radially-extending wall exposed to the core gas flow path and to the secondary cooling flow path, respectively, when the gas turbine engine component is installed within the gas turbine engine;

a plurality of stress relief slots extending axially through the radially-extending wall and having interior slot surfaces; and a high temperature sealing material melted over and bonded to the interior slot surfaces and filling the plurality of stress relief slots, the high temperature sealing material impeding leakage across the radially-extending wall, the high temperature sealing material fracturing to alleviate thermomechanical stress when a temperature differential develops across the radially-extending wall.

12. The gas turbine engine component of claim 11 wherein the component body comprises:

an inner endwall;

an outer endwall circumscribing the inner endwall; and a plurality of circumferentially-spaced vanes extending between the inner and outer endwalls.

13. The gas turbine engine component of claim 12 wherein the first radially-extending wall comprises a rail extending form an edge portion of the outer endwall.

14. The gas turbine engine component of claim 13 wherein the rail comprises an annular sealing surface through which the plurality of stress relief slots extend.

15. The gas turbine engine component of claim 11 wherein the high temperature sealing material comprises a nickel-based braze material.

16. A method for fabricating a gas turbine engine component utilized within a gas turbine engine having a core gas flow path and a secondary flow path, the method comprising:

obtaining a component body having a radially-extending wall projecting therefrom;

forming a plurality of stress relief slots in the radially-extending wall; and filling the plurality of stress relief slots with a high temperature sealing material impeding leakage across the radially-extending wall between the second cooling flow path and the core gas flow path, the high temperature sealing material selected to have a mechanical strength less the parent material of the radially-extending wall such that the high temperature sealing material fractures preferentially to relieve thermomechanical stress when a temperature gradient develops across the radially-extending wall during usage of the turbine nozzle;

wherein filling comprises:

disposing a braze material adjacent the plurality of stress relief slots; and heating the braze material to a sufficient temperature to bond the braze material to surfaces of the radially-extending wall defining the plurality of stress relief slots.

17. The method of claim 16 wherein disposing comprises dispensing the braze material over the stress relief slots in liquid form.

18. The method of claim 16 wherein disposing comprises inserting flexible strips of braze foil into the plurality of stress relief slots.

19. The method of claim 16 wherein the component body comprises an outer endwall, wherein the first radially-extending wall comprises a rail projecting from radially outward from an edge portion of the outer endwall, and wherein forming comprises cutting the plurality of stress relief slots into the rail.

* * * * *